United States Patent [19]

Lyons

[11] 4,125,411
[45] Nov. 14, 1978

[54] KAOLIN PRODUCT
[75] Inventor: Sanford C. Lyons, Bennington, Vt.
[73] Assignee: Yara Engineering Corporation, Elizabeth, N.J.
[21] Appl. No.: 527,151
[22] Filed: Feb. 14, 1966

Related U.S. Application Data
[63] Continuation-in-part of Ser. No. 764,395, Sep. 30, 1958, abandoned.
[51] Int. Cl.$^2$ .......................... C09C 1/28; C09C 1/42
[52] U.S. Cl. ..................................... 106/291; 106/72; 106/288 B; 241/1; 423/328
[58] Field of Search ................ 23/110; 106/72, 288 B, 106/309; 423/111, 1, 659

[56] References Cited
U.S. PATENT DOCUMENTS

| | | | |
|---|---|---|---|
| 3,058,671 | 10/1962 | Billue | 23/110 X |
| 3,343,973 | 9/1967 | Billue | 23/110 X |

Primary Examiner—Edward J. Meros
Attorney, Agent, or Firm—Buell, Blenko & Ziesenheim

[57] ABSTRACT

Delamination of the coarse fraction of washed secondary kaolin clay results in a product that is brighter than the starting material, has a degree of whiteness rivalling that of imported English clays, and is composed chiefly of platy particles of various sizes.

1 Claim, 7 Drawing Figures 34,000X

1μ

INVENTOR
SANFORD C. LYONS

4800X

1μ

4800X

1μ

9900x

KAOLIN PRODUCT

This application is a continuation-in-part of my copending application, Ser. No. 764,395, filed Sept. 30, 1958, now abandoned, for Improved Kaolin Product and Process for Making Same.

The invention relates to an improved Kaolin product which is a step product of the method described therein and is suited in its various forms for use as a pigment in paper coating, in paints, plastics, inks, in ceramics, and various other products. It is characterized by various features of superiority. Some of these are due to the fact that the wide and/or flat faces of most of my novel kaolin product particles do not bear the adsorbed surface stain which characterizes the corresponding faces of most natural kaolin platelets, particularly those of my preferred crude material, as hereinafter described. Some of these appear to be associated with the fact that its particles are unusually platy or lamellar in shape and they are generally larger and thinner than those of the natural, or conventional kaolin plates of comparable size when measured in so-called "Stokesian" terms of "equivalent spherical diameter." Also, many of the plate shaped particles of my novel kaolin pigment are of substantially larger dimensions than any plate shaped particles normally found in natural kaolins. Because of these facts, my novel pigments yield coating films on paper, etc., which are glossier, more opaque, and stronger than those made with conventional kaolin particles of comparable size.

My new product is produced by artificial mechanical delamination of kaolins, preferably of the secondary or sedimentary type such as are found in the Tuscaloosa formation in the states of Georgia, South Carolina and Alabama in the southeastern United States. Its utility is not, however, limited to this particular type of kaolin and may advantageously be applied to certain fractions of other types of kaolin. A preferred method for achieving the required delamination has been described in U.S. Pat. No. 2,904,267. As therein described, delamination is brought about by forcing a stiff slurry of clay through a die having holes of the order of 3/16 inch diameter, the moisture content of the clay mass being such as to require a pressure of at least 350 pounds per square inch to force it through the holes. The severe plastic shearing stresses to which the clay is thus subjected result in delamination of many of the larger particles and a decrease in the viscosity of the mass as a whole. For convenience this treatment is hereinafter referred to as "superstrusion," i.e., extrusion under special conditions of high pressures not less than 350 pounds per square inch.

The subject matter of the instant invention involves a new facet of clay technology and there is still considerable controversy regarding some of the terminology used in discussing various features of the subject. For this reason, it is deemed desirable to present here a brief definition of certain terms, as used in the instant disclosure, and some indication of their significance in relation to the relevant subject matter.

The measurement of particle shape and fineness and/or of particle size distribution of materials like the kaolins which are the subject of the instant invention is not a simple matter, nor is yet any method officially recognized or well established as such. In the studies upon which the instant application is based, the novel products were evaluated, for particle fineness, in terms of Stokesian "equivalent spherical diameter," because no other reliable, reproducible method was found by this applicant. It is, of course, possible that new and better methods for the purpose will be found. In that event, the preferred Stokesian values of this applicant could be expressed in terms of values of the new method, after making suitable calibration tests by both methods on a specimen of the kaolin involved.

So far as this applicant is aware, no definitive method for determination of particle size distribution of polydisperse, irregular shaped particles, such as kaolin, by means of any electron-microgrphic image count, has been officially approved or adopted by any recognized scientific body, and its attempted use for the instant purpose is of dubious reproducibility. This matter is more comprehensively discussed in publications such as TAPPI Monograph Series No. 20 (1958) "Pigments for Paper Coating," particularly at pages 71–72 and 83–84 wherein it is pointed out that micrographic methods, whether optical or electron, are practically useless for complete evaluation of size distribution of these clays because the particles are of such extreme fineness that, for example, a million one-micron particles could be placed (without overlapping each other) on the head of a one square millimeter pinhead, and even more confusing is the fact that the particles are of every conceivable shape and size, so that the question of which diameter is to be considered *the* diameter is not a simple one. To make the matter even more difficult, the fact is that their thickness is often not uniform at different points. Consequently, the only presently known practical methods for quantitative determination of particle fineness distribution are based upon the subsidence rates of the particles, while suspended in water, and these values are expressed in terms of "equivalent spherical diameters."

As expressed in the above cited bibliographic reference "a clay particle of 1.0 micron, e.s.d. is one which subsides at the same rate as would a truly spherical clay particle of 1.0 micron diameter, if there were one." Particularly helpful is the fact that e.s.d. values are expressable in terms of percent by weight. Therefore unless otherwise specified, all references herein to particle size will be made in terms of "equivalent spherical diameter," i.e. as "e.s.d."

Only the electron micrographs are capable of showing the individual particles sufficiently highly magnified so as to reveal details of shape of a few individual particles at a time and from these a few qualitative indications may be obtained. Also, by shadowing techniques such as those published by Comer, Stetson and Lyons, "TAPPI" 38, No. 10: 620–624 (October 1955), it is possible to obtain a reasonably good idea of the diameter thickness ratio of a few individual clay particles.

For a better understanding of the invention, reference may be had to the drawings, of which FIG. 1 is a micrograph of natural kaolin "fines" magnified 34,000 times;

Figure 7:
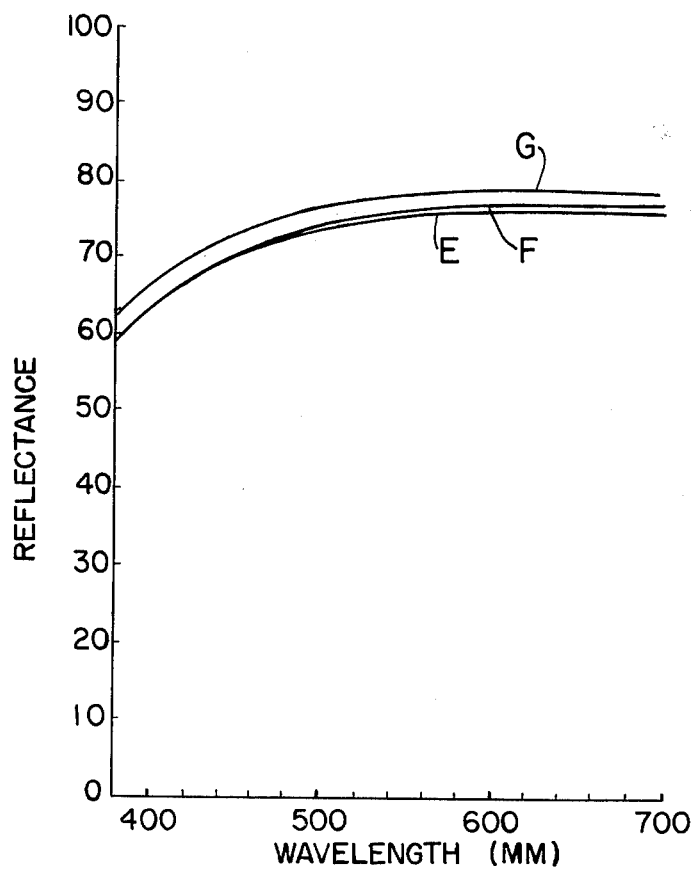

FIG. 7 is a graph of spectrophotometric curves of sheet coatings of natural and delaminated kaolins.

When it is realized that a rather good electron micrographic field at magnification of about 16,000 × migh reveal only about 25 measurable images and their "shadows", and that there is no known practical technique whereby one could be certain that, in any series of such micrographs, a reasonably representative distribution of the different sizes of particles present in a sample could be presented, it will be readily evident that any attempt to use this method for a reproducible, complete, quantitative evaluation of the size distribution of a sample of clay, even as small as a pinhead, would be impractical. However, these micrographic methods, if used with suitable discretion and understanding, for study but not for determination, can be very helpful in a qualitative fashion and yield very instructive insights into some of the effects of particle shape upon the use properties of the various clays. Besides, kaolin is a rather unusual mineral in several respects but more particularly in respect to its particle shape at various size ranges. These dimensions are so extremely small as to be expressed in sub-micron and/or micron terms and measured by parameteric methods which require specialized techniques and interpretations.

Prior to 1931, little if anything was definitely known concerning the true shape of natural kaolin particles, or the effect if any which it might exert on their use properties in paper coating, etc. On Nov. 26, 1934, W. T. Maloney filed an application covering "Clay Product and Process for Preparing Same" which issued on May 16, 1939 as U.S. Pat. No. 2,158,987. This patent taught that the natural kaolin particles finer than about 2 microns, e.s.d., produced paper coatings much superior in gloss, opacity, and general utility to kaolins containing sizeable proportions of particles coarser than this. This disclosure, though empirical in its derivation, produced a revolution in the kaolin industry and even in the paper and printing industry the impact of which is not yet exhausted.

In 1951, Woodward and Lyons, "TAPPI" 34, No. 10: 438-442, reported that natural kaolin particles occur in two generically different shapes, and that these two different particle shapes occur in essentially two different particle size ranges, and that the 2 micron diameter "control point" previously nominated by Maloney demarcated the dividing point between the two types. Finer than about 2 microns, the kaolin particles became known as "plates" because they are predominately actually thin, hexagonal plate crystals and/or thin, face-to-face aggregations of these "plates" or "platelets." The diameter to thickness ratio of a "plate" or plate-like particle is always greater than unity and is often greater than 10.

Figure 1:
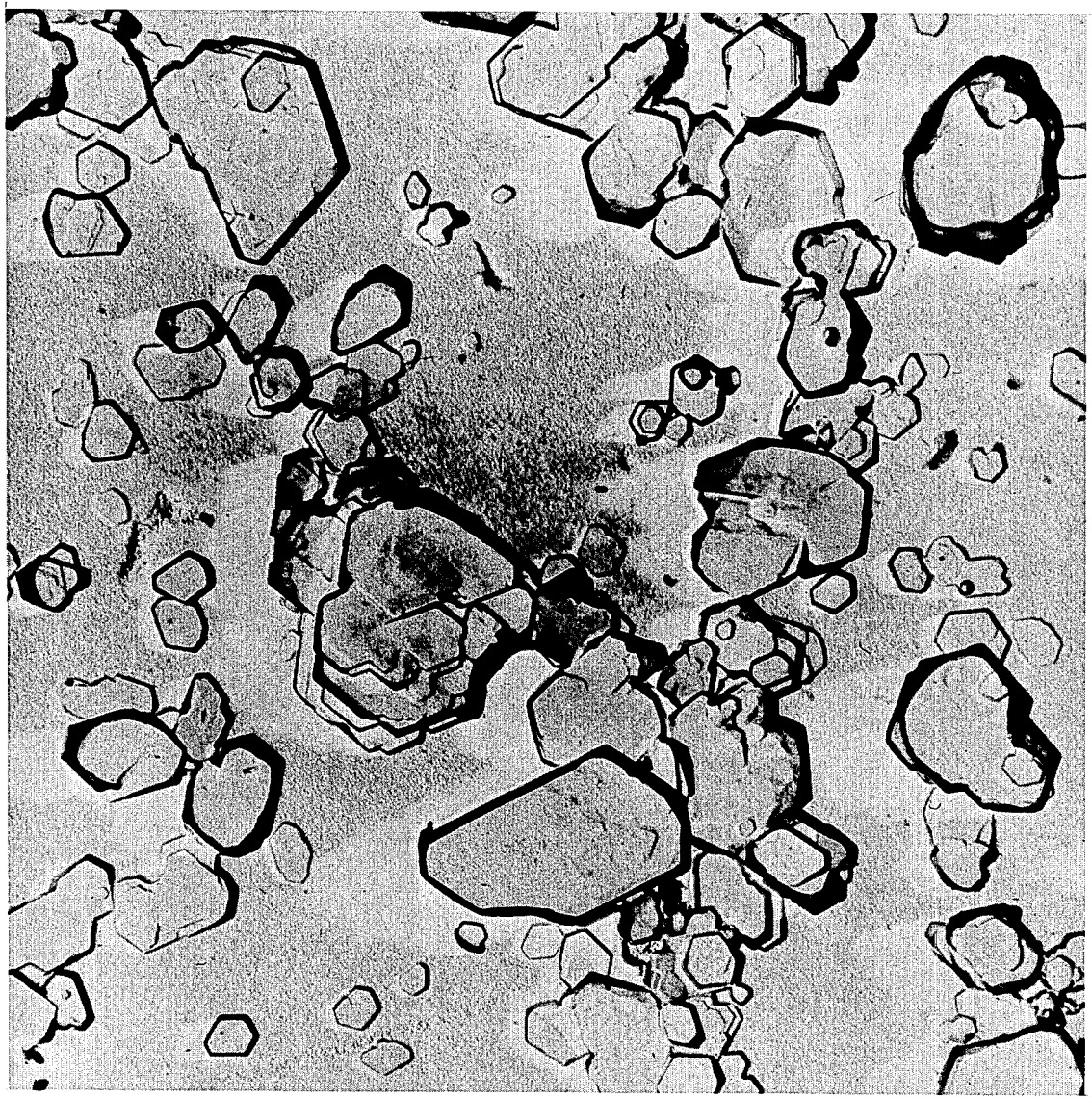

Examples of natural kaolin plates can be seen in FIG. 1.

Figure 2:
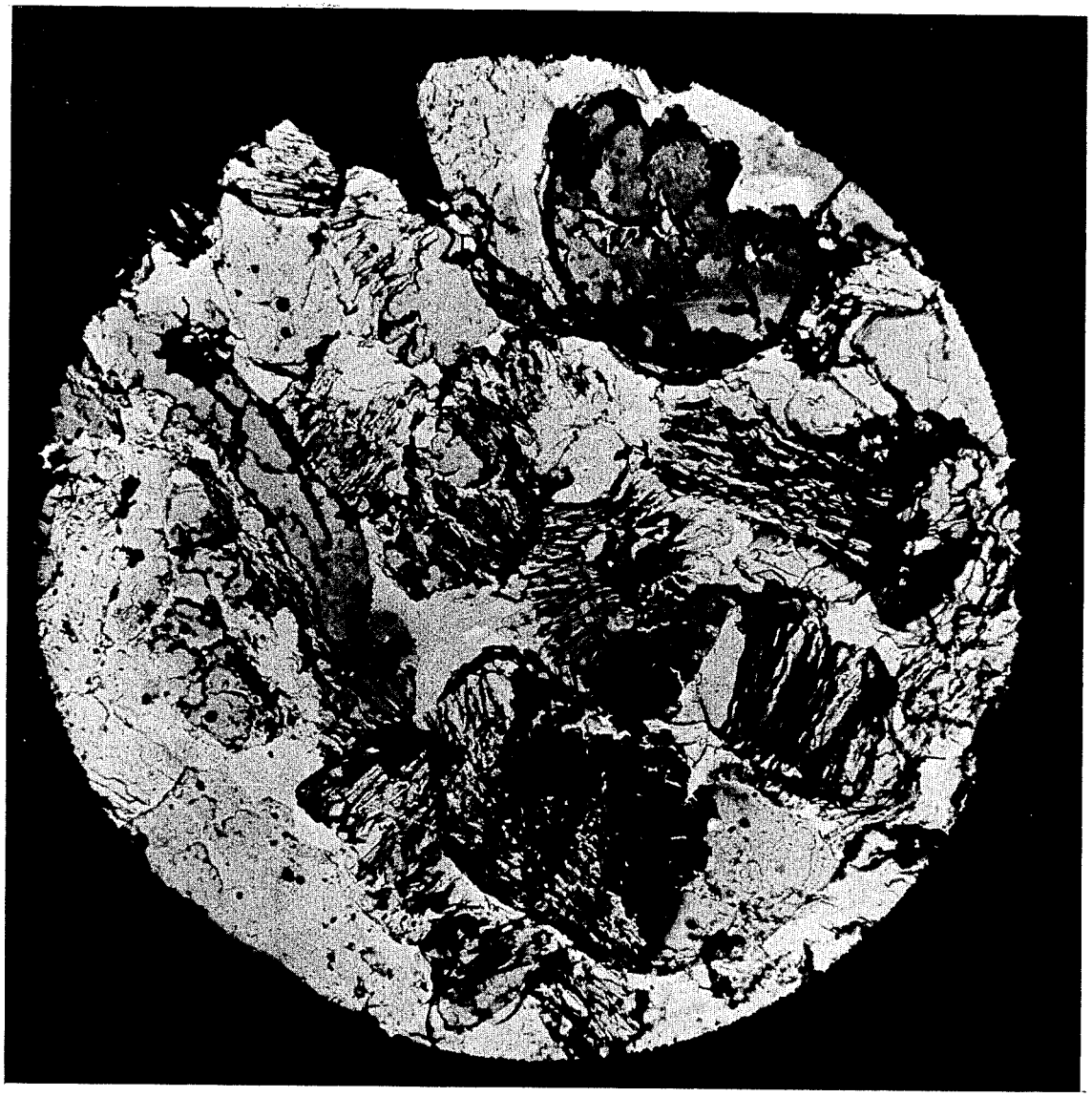
FIG. 2 is a micrograph of natural "stacks" magnified 4800 times.

Coarser than about 2 microns, natural particles are classed as "stacks" and are made up of face-to-face aggregations of the hexagonal plate crystals often in a mosaic configuration, so that a single "stack" often embodies more than one "pile" of plates. Examples of natural kaolin "stacks" (of a size range between 5 microns and 8 microns) are illustrated in FIG. 2. The diameter to thickness ratio of a "stack" (sometimes referred to as a "booklet" or an "aggregate") is less than unity. In FIG. 2, the tendency of the stacks to orient themselves edgewise to the substrate is clearly evident, and this feature is of practical significance in their use properties, in that they thus tend to form a coating whose surface contains a majority of irregularly shaped particles which have assumed a random orientation, thus greatly reducing any natural tendency to form glossy and smooth surfaces.

Furthermore, these stacks are naturally formed, face-to-face aggregations of plates which do not spontaneously delaminate, when placed in water, even when treated with chemical deflocculating agents. Although the mechanism of the cohesion that holds these plates together is not well understood at this date, it is a very strong force, and severe mechanical delaminating stresses are required to split the plates apart. Some idea of the structural durability of the stacks may be had from the fact that in commercial production practice they are often slurried in water and pumped by centrifugal pumps through miles of pipe lines to the mill. They are then projected into high speed centrifuges for classification and emitted therefrom at high speeds with no appreciable delamination of the stacks.

While seeking a practical, economic method for comminuting the coarse particles (i.e. the "stacks" greater than 2 microns) which were obtained as a more or less unusable by-product from the production of paper coating clays by processing sedimentary kaolins from the "Tuscaloosa Formation" in the southeastern section of the U.S.A., it was discovered that if these clays were moisture conditioned within certain rather narrow limits of water content, and then subjected to an intensive plastic shearing treatment, as by forcing, through small die-apertures, one or more times the very stiff mass thus formed, a significant increase in content of "fines" (particles less than 2 microns, e.s.d.) was obtained.

In the course of experiments to refine and develop this process, it was also discovered that if most of the natural "fines" (less than 2 microns e.s.d.) were first removed from the clay so that the resultant clay contained at least about 80% coarse particles, and then this clay was subjected to the above-mentioned plastic shearing process one or more times, without any subsequent classification step, the resultant product obtained a majority of its particles sufficiently delaminated to endow it with improved whiteness and gloss producing properties as compared with those of its source material and as compared with natural kaolin of similar particle size distribution. This clay was, even in quantitative terms of measurement by means of the G. E. Hardy Recording Spectrophotometer, as white as the best of the improved English kaolins and often whiter than many of the standard English clays. It was of a blue-white color in a true, quantitative sense of its "whiteness index" being in the same range as that of the better English coating clays, and not merely as expressed in comparative terms such as "distinct blue-white" etc. According to the "TAPPI" Monograph, Series No. 20, page 69 (1958), the whiteness index of these English clays range from less than 14.0 to about 10.0, this being an inverse index, and this new product showed an index well within the better values.

It has been found that improved gloss producing properties and whiteness as compared with natural kaolin of the same particle size distribution will result when the kaolin being delaminated contains 50% to 100% particles coarser than 2 microns e.s.d.

Incidentally, perhaps it should be pointed out that it has been found to be more expedient to operate these delamination processes in such fashion that a complete delamination of all the stacks is not attained in a single stage of operation, so that an interstage classification and/or recovery of those fines first formed is made and the residue is re-extruded as many times as desired. This discovery was disclosed in my co-pending application Ser. No. 764,395, filed Sep. 30, 1958. In the course of development and refinement of equipment for commercial production of these new products, a study of the new properties of some of the many possible different particle size fractions which could be prepared from the extrusion-delaminated product of my earlier process was made. At that time, the practical significance of the "Maloney Control Point" at 2 microns, e.s.d., had become well established in the kaolin industry, worldwide, so that it was logical to assume that the basic criterion of coating properties of the new delaminated kaolins would remain as the proportion of its particles which were finer than 2 microns, e.s.d., as in the case of the natural clay particles from which these new products were derived.

As this investigation progressed, it became more clearly evident that the kaolin plates of the new product produced by the delamination were somewhat different from the natural kaolin plates, as found in conventional coating clays. They were known to be whiter, but the complete comparative evaluation of the shape and actual size and size-distribution of materials as fine, as polydisperse, and as irregular in shape as these delaminated kaolins cannot yet be done reproducibly, by any practical technique known to this applicant. As previously pointed out, the Stokesian methods of fineness distribution measurement are the only practical ones yet known. It was eventually and repeatedly noted, however, that for a given less than 2 micron, e.s.d. content, the delaminated clays always seemed to yield test paper coatings which were of substantially higher gloss value than were coatings made from conventional clays of comparable fineness. Even relatively coarse-particle extruded specimens which had not been classified after extrusion delamination were found to exhibit use properties, such as gloss, brightness and whiteness superior to those of the same source clay material prior to its extrusion.

Figure 6:
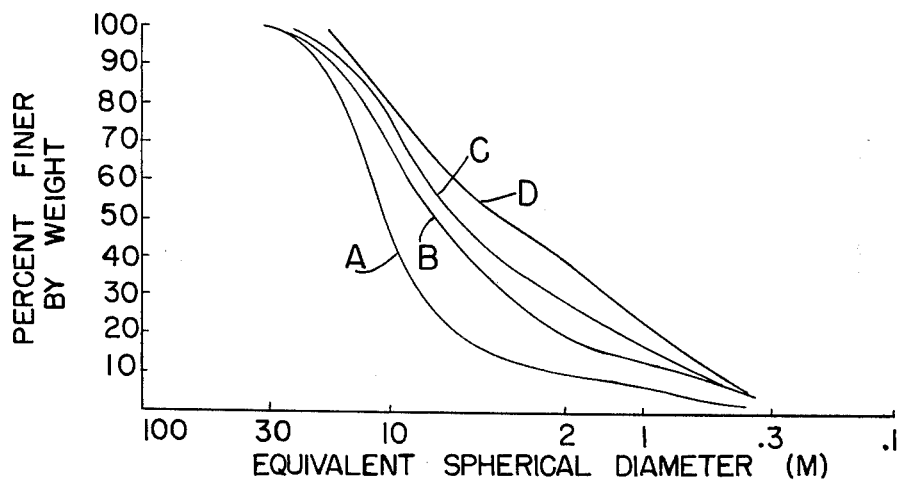
FIG. 6 is a graph of particle size analysis curves of kaolin before delamination treatment, and after 3, 10 and 50 passes, respectively, through the die of an extruding mechanism.

Experimental extrusion studies were first made on material of this sort, that is, the coarse fraction of classified washed kaolin having approximately 20% moisture content, using a "Hamilton Beach" electric meat grinder, fitted with a special home-made die plate having 3/16 inch holes. The pressure required to force clay of this thick consistency through holes of that size, was measured and found to be in excess of 350 p.s.i. The results of this experiment are indicated in FIG. 6 of the drawings, curve A being a graph of the particle size distribution of the source material before passage through the extruder. Curves B, C and D are particle size analyses of the same material after being extruded 3, 10 and 50 passes respectively. The increase in particle fineness was immediately noticed but attention at that time was focussed on the percentages of "fines" occurring in the products of the "superstrusion" process because of the then recently established teachings re the 2 microns, e.s.d. "control point" of Maloney, there appeared no reason to seriously consider the potential coating utility of the delaminated clay particles in the greater than 2 micron, e.s.d., range because they were assumed to be "stacks," and ipso facto of little, if any, value as a coating pigment. That this attitude has been general is clearly understood by a technical paper published in the December 1965 issue of "TAPPI" (vol. 48, No. 12, pages 92A et seq.).

Recently, using this identical meat grinder and die plate, delamination tests have been repeated, duplicating some of those previously made. Tests now made on the extruded product thus obtained, without any subsequent classification, revealed the fact that, although the particle size distribution of this new product would lead one acquainted with the well established Maloney control point of 2 microns, e.s.d. to assume that this product had too large a coarse fraction to have desirable use-properties of gloss, brightness, whiteness and opacity of its coated sheets, it nevertheless yielded coatings such as would have been expected only from a much finer clay.

In Table 1, below, are presented data comparing the optical properties and the coating qualities of an extruded product made by "superstruding", hereinbefore described, a coarse particle kaolin through the 3/16 inch holes in the die plate of the above mentioned electric meat grinder, the clay having a moisture content such as to require a pressure of at least 350 p.s.i. to force it through the holes, with those of the same natural product without extrusion. Since the delamination treatment had split apart some of the coarser particles of the original clay, the control sample was given a special screening treatment to bring it more nearly into the same fineness range as the "superstruded" one by eliminating all particles greater than 43 microns, e.s.d.

TABLE I
EFFECT OF DELAMINATION
UPON OPTICAL AND COATING PROPERTIES
OF COARSE PARTICLE KAOLINS

Pigment Properties (Unbl.)

|  | Brightness | White Index | Gloss |
|---|---|---|---|
| Coarse Clay (Control) | 77.4 | 17.9 | 2.5 |
| Delam. (Thru H & B) | 82.1 | 14.3 | 4.5 |

Coated Test Sheets

|  | Brightness | White Index | Coat Wgt. |
|---|---|---|---|
| Coarse Clay (Control) | 70.9 | 12.4 | 10.2 |
| Delam. (Thru H & B) | 73.8 | 12.1 | 10.4 |

Note:
"Whiteness Index" is an inverse index.

The spectrophotometric chart in FIG. 7 shows that, even without benefit of classification, the coarse particle kaolin which had been merely delaminated by means of the Hamilton Beach meat grinder gave a coating which was definitely glossier, brighter and whiter (curve G) than that produced by the control clay, either before (curve F) or after (curve E) removal of the oversize particles of the latter. This improvement in the coating was evident also in papers calendered under similar conditions of calendering intensities.

Table 1a and Table 1b below present similar data from comparable tests made with a coarse-particle primary kaolin from the Cronwall District of England and a coarse particle kaolin from Eastern Bavaria in Germany, respectively.

The data presented were obtained from unbleached specimens, in order to demonstrate more explicitly the highly significant improvement in the pigment and coating qualities of the superstrusion treatment alone.

All of the specimens would have shown further improved brightness and whiteness values had they been subjected to the conventional bleaching treatment. In fact, the superstrusion treatment frequently facilitates the bleach response of kaolins, presumably by virtue of its comminution of the ferruginous impurities, thereby rendering them more chemically reactive with bleaching reagents even though the comminution itself may temporarily have made the impurities tinctorially more objectionable than before. For this reason bleaching treatments, to be effective, must be done subsequent to delamination.

TABLE 1a
EFFECT OF DELAMINATION UPON OPTICAL AND COATING PROPERTIES OF COARSE PARTICLE PRIMARY ENGLISH KAOLIN

Pigment Properties (Unbl.)

|  | Brightness | White Index | Gloss* |
|---|---|---|---|
| Coarse Clay (Control | 77.4 | 14.3 | 3.5 |
| Same After Delamination | 8.14 | 12.1 | 6.0 |

*These values made on test sheets of the clays. Coated Test Sheets

|  | Brightness | White Index | Coat Wgt. |
|---|---|---|---|
| Coarse Clay (Undelam.) | 72.3 | 11.1 | 9.0 |
| Same After Delamination | 73.0 | 10.1 | 9.0 |

TABLE 1b
EFFECT OF DELAMINATION UPON OPTICAL AND COATING PROPERTIES OF COARSE PARTICLE GERMAN KAOLIN

Pigment Properties (Unbl.)

|  | Brightness | White Index | Gloss* |
|---|---|---|---|
| Coarse Clay (Control) | 75.5 | 14.5 | 4.0 |
| Same After Delamination | 80.9 | 13.5 | 6.0 |

These values made on test sheets of the clays. Coated Test Sheets

|  | Brightness | White Index | Coat Wgt. |
|---|---|---|---|
| Coarse Clay (Undelam.) | 69.6 | 11.4 | 9.3 |
| Same After Delamination | 72.1 | 11.8 | 9.0 |

Further evidence of the unusual properties of this new delaminated kaolin product is seen when it is calcined to 1,000° C. and compared with its source material when similarly calcined.

TABLE II

| | BEFORE CALCINATION | | AFTER CALCINATION | | |
|---|---|---|---|---|---|
|  | Bright | W.I. | Bright | W.I. | Abrasion |
| Coarse Clay (Undelam.) | 76.3 | 18.3 | 82.3 | 21.0 | 206.0 |
| Coarse Clay (Delaminated) | 81.3 | 14.7 | 85.6 | 17.5 | 105.9 |

It is seen that brightness of both the original clay and its delaminated form is markedly increased by the thermal treatment. The delaminated form shows a brightness value of 85.6, despite the fact that it is a comparatively coarse particle material. If it were suitably classified so as to produce a finer material it would readily give a brightness index in the 90's since brightness is in part a function of fineness.

The above table shows that the delaminated coarse clay, when calcined, has a Valley abrasion index radically lower than that of underlaminated calcined clay of similarly sized particles. At first, this seemed inconceivable because measurements were made upon both natural clays and delaminated clays of comparable equivalent spherical diameter fineness ranges, often in the coarser range. Careful study of electron-micrographs of calcined kaolins has revealed that during the higher temperature phases of the heating, the alumina and silica molecules of the original kaolin react together to form a new substance, mullite, whose crystals are long, slender needles. These tend to grow and to protrude from the edges of the component hexagonal kaolin crystal plates with the result that they form a sort of "crystal fuzz" but a very hard and abrasive one, at the edges of the plates. When these crystal plates are found assembled in natural stacks, many of these hard needles act like cutting points on a round file and the abrasiveness of the stacks is therefore very high. However, when these stacks are split, before heating, into relatively flat plates, the hard needles formed later project mainly from their edges, and their mass abrasive effect is greatly reduced.

Figure 3:
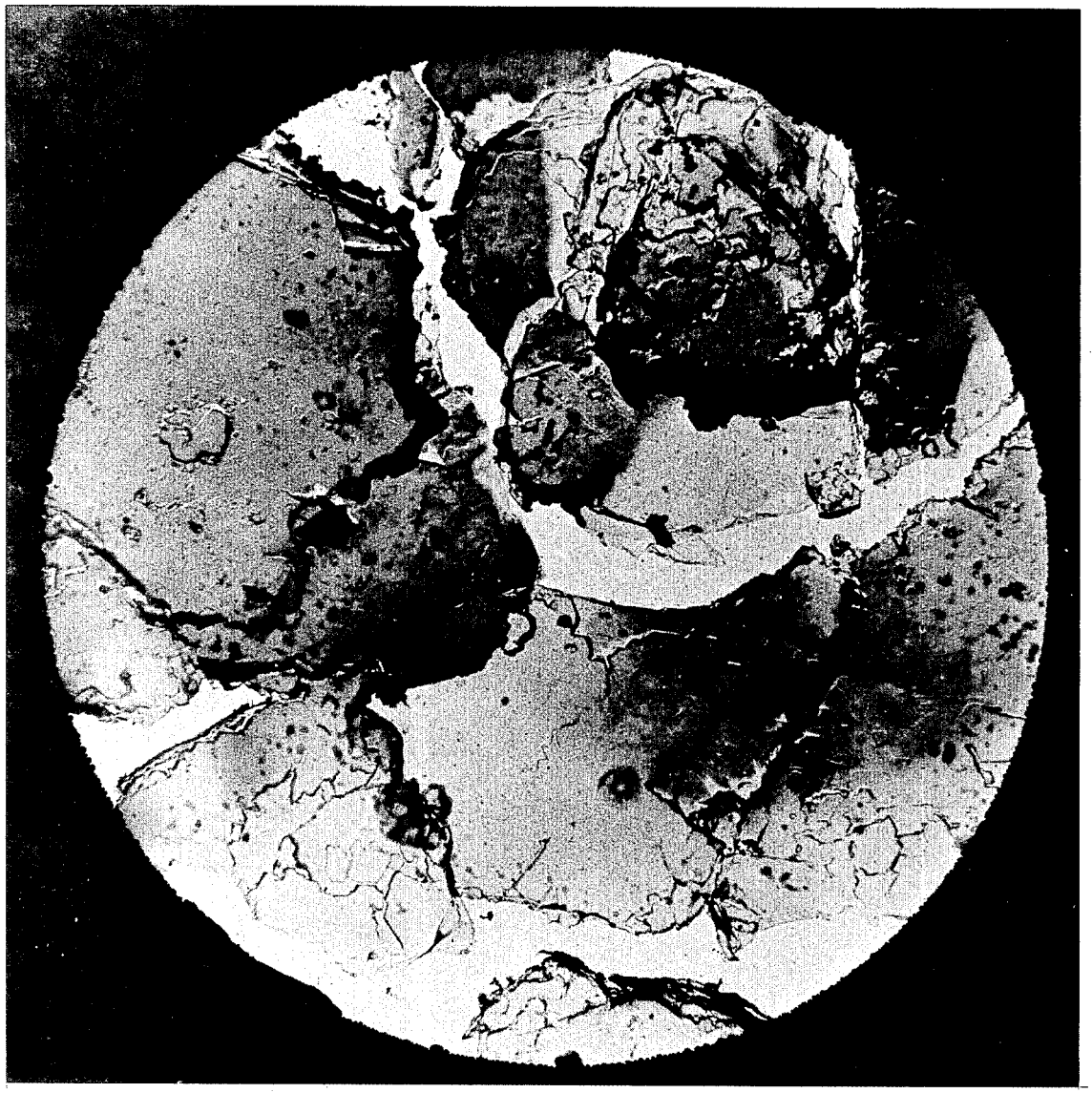
FIG. 3 is a micrograph of delaminated plates magnified 4800 times.
Figure 4:
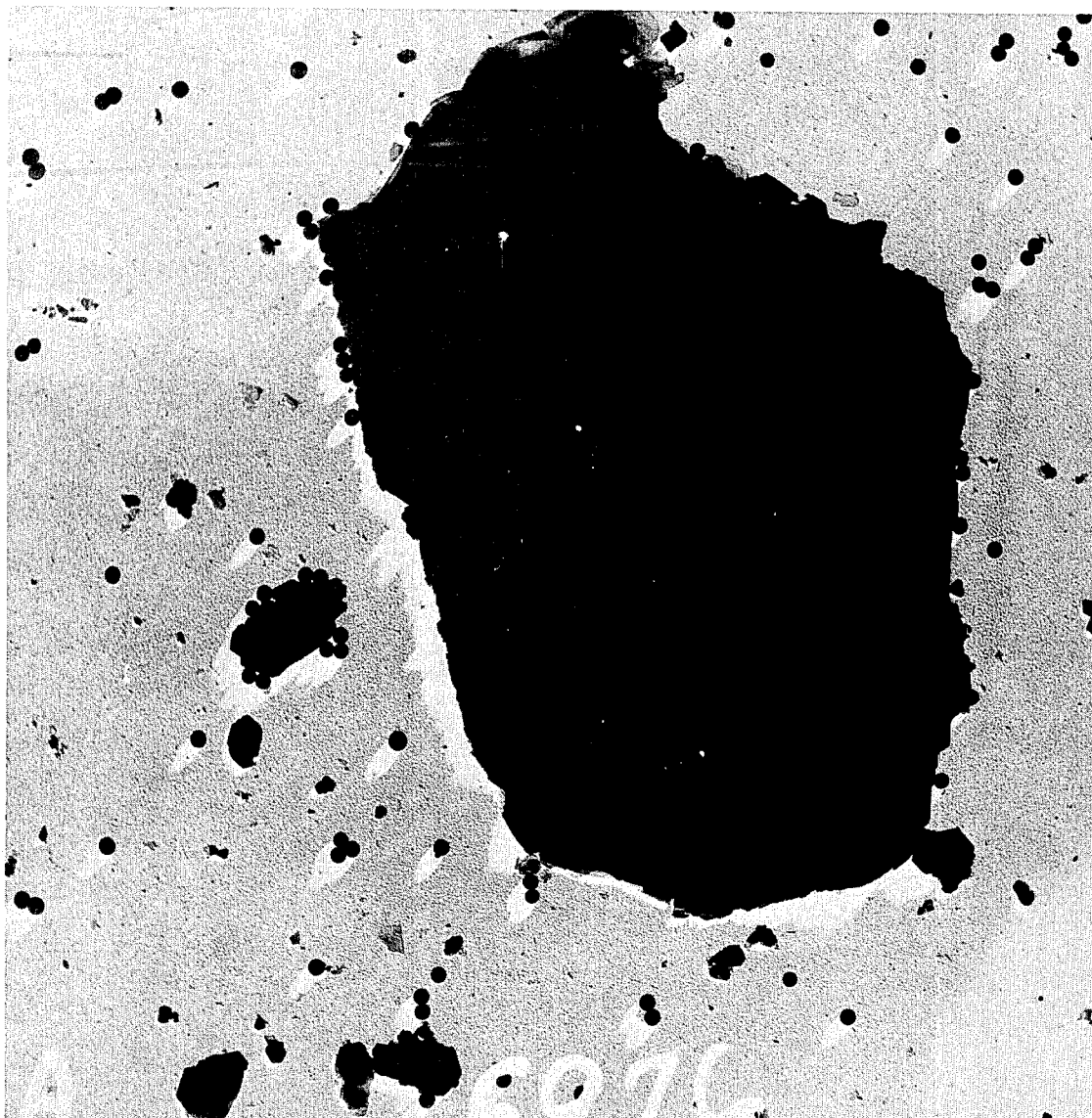
FIG. 4 is a micrograph of a delaminated plate and a number of latex particles, magnified 9900 times.
Figure 5:
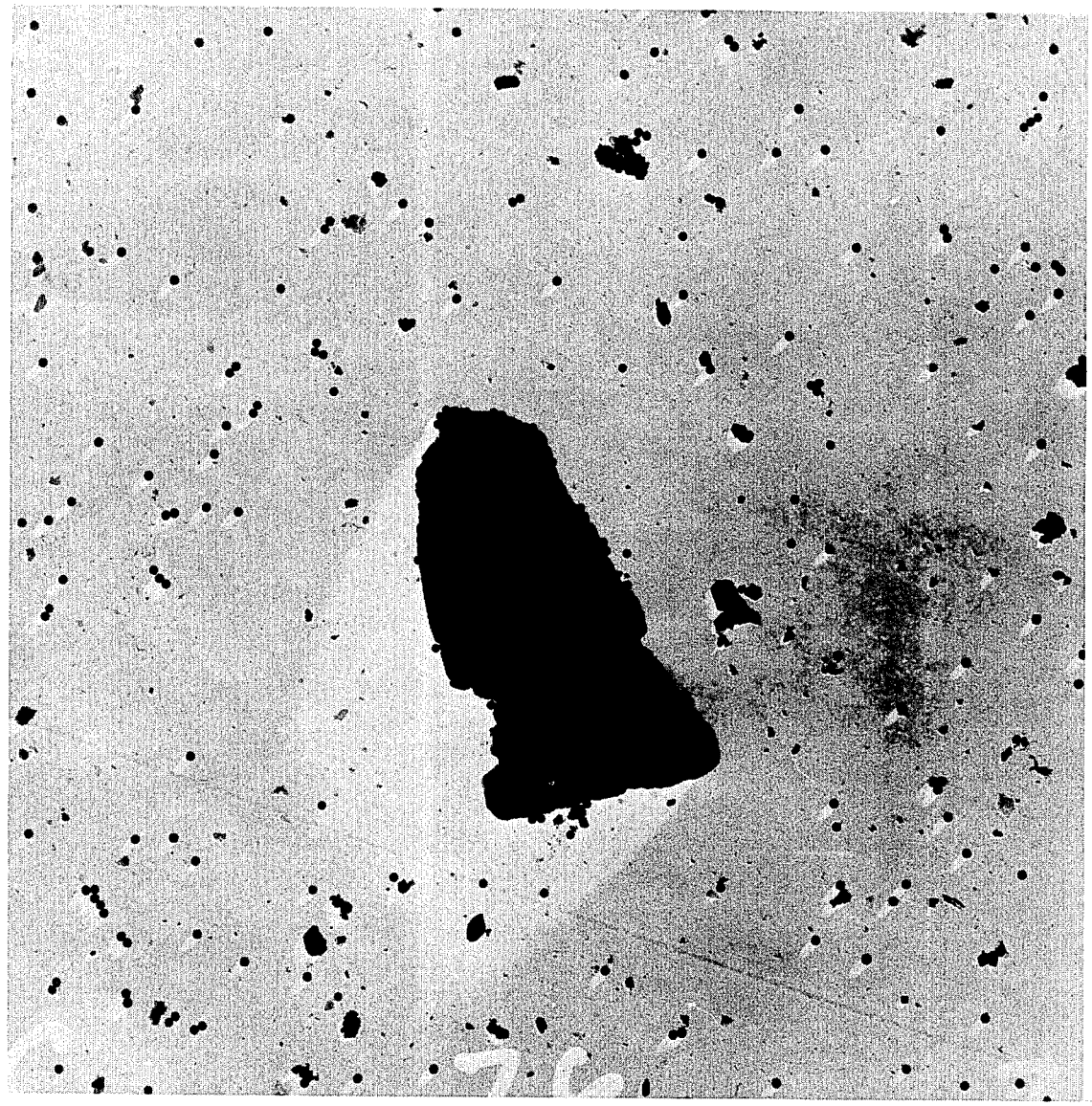
FIG. 5 is a micrograph of a delaminated plate and a number of latex particles, magnified 5600 times.

When it is realized that the delaminated kaolin specimen, above described, had not been classified in any way after delamination, so that it undoubtedly still contained a large proportion of coarse particles, i.e. larger than 2 microns, its relatively low abrasiveness and its high brightness are exceptional and are evidence of the fact that most of its original natural stack particles have been delaminated in some degree so that the product is substantially free of undelaminated aggregates and booklets and is composed substantially of individual plates, the platelets of more than two microns in size predominating on a weight basis. While, as previously explained, micrographic methods of size distribution for materials as fine and polydisperse as these are subject to question if attempted for quantitative use, electron-micrographs of this material as seen in FIGS. 3, 4, and 5 graphically sustain the above descriptions, and reveal that the coarse clay, after delamination in the H & B grinder, does in fact contain plate shaped particles in a wide range of sizes, a significant proportion of the particles in excess of two microns in size having a ratio of diameter to thickness in excess of 6, the ratio of diameter to thickness of many of such particles increasing as the diameter of the particles increases. Tests have shown that this product gives a coated paper with an uncalendered gloss at least several points higher on a glossmeter than the uncalendered gloss of conventional domestic coating clays of comparable size distribution, and that it has an adhesive demand no greater than that of conventional coating clays of comparable size distribution. This product when calcined had a materially increased G. E. brightness and a materially lower abrasion index than conventional calcined domestic clays.

As revealed in application Ser. No. 764,395, delaminated particles (speaking of the less-than-two microns e.s.d. plates) "are different from the natural plates found in the original kaolin. They are whiter and brighter in the unbleached form and they, furthermore, bleach to values of brightness and whiteness unattainable by similar treatmemt of the naturally occurring 'plates'. Electron micrographic studies indicate that the delaminated plates and/or sheets (i.e. mosaics of the edge-to-edge plates) tend to be longer and wider than are the corresponding naturally occurring ones." Still, when that application was filed, it was only the less than 2 microns plates which were thought to be suitable for use as a coating pigment, because the disclosures of Maloney and others had focussed on the size of 2 microns e.s.d. as the dividing line between "plates" (2 microns or less), suitable for coating paper, and "stacks" (greater than 2 microns), not suitable for coating paper, as the only then known relation between the size and shape of individual particles.

I have also discovered that other novel products can be made by segregation of certain size ranges of the delaminated particles produced by my extrusion delamination process. Specifically, I have found that if I take the above described product from the extrusion process, which embodies a spectrum of particle sizes ranging from about 0.1 micron up to about 25.0 microns, and first classify out of its particles coarser than about 10 microns, e.s.d., and then from the finer fraction thus obtained, I decant off a fraction containing most of the particles finer than 2 microns, e.s.d., I thereby obtain a fraction of intermediate size, e.g. from about 2.0 microns to 10.0 microns, e.s.d. which possesses properties markedly different from and superior to those of a corresponding fraction which would have been obtained by a similar fractionation of a natural kaolin.

Whereas a comparable fraction from a natural kaolin would have yielded, according to the teachings of Maloney, only coatings of inferior gloss, opacity, brightness and whiteness, this new product, despite the fact that its particles are in the same Stokesian size range, gave coatings of surprisingly good gloss and color. Many of the optical properties of this coating material are equal, or superior, to those of natural kaolin fractions in a range embodying a much higher proportion of the less than 2.0 microns diameter. For certain purposes, this new product is even more useful because the removal of the less than 2 microns diameter "fines" endows it with other distinctive and favorable properties such as extraordinary ease and completeness of "makedown" or dispersion in fluid vehicles such as water, adhesive solutions, ink vehicles, etc.

A major reason for the superior pigmentary properties of this new product can be seen by reference to FIG. 2, which shows natural kaolin "stacks" between 5 microns and 8 microns (magnified 4,800 ×) and FIG. 3, which shows delaminated plates of the same size (in e.s.d. dimensions), produced by delamination of natural "stacks" from the same source material as those seen in FIG. 2.

As an example of the superior glossing properties of my new delaminated kaolin product when compared with a natural kaolin product of similar size distribution, reference is made to an example which was offered in my co-pending application Ser. No. 227,488, filed Oct. 1, 1962, of which the instant Application is a continuation in part. Therein I showed the following comparisons.

TABLE III

| | GLOSS COMPARISON | |
|---|---|---|
| | Natural 2–10 mu | Delaminated 2–10 mu |
| On paper base | 4.5 | 7.5 |
| On glass | 4.5 | 8.0 |
| | Wax Pick. | |
| On paper base | 3.0 | 4.0 |

The superior film strength produced by my novel platy pigment is evidenced by the fact that the coating containing the delaminated clay showed a higher wax pick than did the coating with the natural clay.

This again is evidence of the wide, thin, platy shape of the delaminated kaolin particles and in FIGS. 4 and 5 there are seen particles whose diameters, either by electron micrographic or equivalent spherical measurements, are greater than 2 microns.

As in the product above described with the broader spectrum of particle fineness, this delaminated product when calcined to 1000° C. shows a lower abrasiveness, e.g. 155.7, than the corresponding natural clay fraction when calcined, e.g. 201.4.

The natural, vermicular stacks in FIG. 2 are seen to have oriented themselves mostly in an edgewise configuration, whereas the definitely more plate-shaped particles in FIG. 3 are seen to be lying flat-wise which accounts for the superiority in gloss, opacity and strength of their coating films.

A comparison of FIG. 1, which is an electron-micrograph of natural kaolin plates, with FIGS. 4 and 5 which are electron-micrographs of some of the kaolin product which has been delaminated by means of the H and B meat grinder, gives some idea as to the relative size and shape of some natural fines and some of the larger products of delamination. The latter two micrographic fields contain, in addition to kaolin particles, several plastic latex spheres which serve as calibration media for estimating the thickness of the particles.

The technique for making electron-micrographs of this kind has been described by "Laboratory Techniques in the Electron Microscopy of Clay Minerals", John L. Brown, "Soil Clay Chem.", University of North Carolina Press 1964 and others and consists, basically, of comparing the length of the "shadow" cast by the kaolin particle with the length of the shadow cast by the sphere and multiplying the quotient by the diameter of the sphere.

Obviously, for such a purpose, the diameter of the particle which is assumed to be *the* diameter thereof will be the measured width of the particle, measured parallel to the direction of the cast shadow and, obviously, "the diameter-thickness ratio" of the particle will be this diameter divided by the thickness of the particle, as above computed.

Considering the large particle in FIG. 4, and proceeding as above outlined, it will be seen that the particle has a "diameter" of 11.1 mu and a diameter-to-thickness ratio of 40.1. Similarly measuring the indicated 6 mu particle in FIG. 5, it is seen that its diameter/thickness ratio is 2.8:1. It is thus seen that, in these novel delaminated kaolins, the larger particle has a higher ratio than does the smaller one. This is a rather anomalous condition, and is contrary to the experience usually noted with natural clay particles in this size range. Usually the fines, i.e. the plates less than 2 microns e.s.d. are very thin and have a ratio of the order of perhaps 10, whereas the natural stacks greater than 2 microns, e.s.d. have a much lower ratio, e.g. in the order of 1. or 2. These micrographic data tend to confirm the simulated service test indicators, above mentioned, with respect to such qualities as film strength and gloss.

By reference, said applications Ser. No. 764,395 and Ser. No. 227,488 in their entireties and including the drawings therein are made a part hereof and by said reference shall have the same force and effect as if they were completely recited herein.

I claim:

1. A new delaminated clay product produced by delamination of a domestic sedimentary kaolin clay fraction containing substantial amounts of aggregates or more than 2 microns in size, said clay product having a distinct blue-white color comparable with that of improved English clays, said product being substantially free of undelaminated aggregates and booklets and being composed substantially of individual platelets, and containing a sufficient amount of platelets of more than 2 microns in size so as to predominate on a weight basis, a significant proportion of the platelets in excess of 2 microns in size of said product having a ratio of diameter to thickness as determined by the electron micrograph which is in excess of 6 and in which the ratio of diameter to thickness increases as the diameter of the platelets increase, and giving a coated paper with an improved uncalendered gloss at least several points higher on the Bausch and Lomb gloss meter than the uncalendered gloss of conventional domestic coating clays of comparable particle size distribution, said clay product having an adhesive demand no greater than that of conventional domestic coating clays of comparable size distribution, and said product on calcination giving a calcined product having a materially increased G. E. brightness and a materially lower abrasion index than conventional calcined clays.

* * * * *

UNITED STATES PATENT OFFICE
CERTIFICATE OF CORRECTION

Patent No. 4,125,411  Dated November 14, 1978

Inventor(s) Sanford C. Lyons

It is certified that error appears in the above-identified patent and that said Letters Patent are hereby corrected as shown below:

Column 1, line 11, --printing-- should be inserted before "inks".

Column 2, line 12, "electron-microgrphic" should read --electron-micrographic--.

Column 2, line 45, a period should be inserted after "e.s.d.".

Column 3, line 6, "migh" should read --might--.

Column 4, line 51, "improved" should be --imported--.

Column 4, line 59, "range" should read --ranges--.

Column 5, line 10, "new" should be --use--.

Column 6, line 1, "understood" should be --illustrated--.

TABLE I, column 6, line 34, "igment" should be --Pigment--.

Column 6, line 56, "Cronwall" should be --Cornwall--.

UNITED STATES PATENT OFFICE
CERTIFICATE OF CORRECTION

Patent No. 4,125,411　　　　　　　　Dated November 14, 1978

Inventor(s)　Sanford C. Lyons

It is certified that error appears in the above-identified patent and that said Letters Patent are hereby corrected as shown below:

TABLE 1b, Column 7, about line 27, an asterisk (*) should be inserted before "These values...".

Column 10, line 44, "indicators" should be --indications--.

Claim 1, column 10, line 54, "or" should read --of--.

Claim 1, column 10, lines 56-57, "improved" should be --imported--.

Signed and Sealed this

Twentieth Day of March 1979

[SEAL]

Attest:

RUTH C. MASON
Attesting Officer

DONALD W. BANNER
Commissioner of Patents and Trademarks